United States Patent
Odaka

(10) Patent No.: US 8,814,708 B2
(45) Date of Patent: Aug. 26, 2014

(54) TORQUE LIMITER AND POWER TRANSMISSION DEVICE

(75) Inventor: Kenji Odaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/637,378

(22) PCT Filed: Apr. 21, 2010

(86) PCT No.: PCT/JP2010/057046
§ 371 (c)(1),
(2), (4) Date: Sep. 26, 2012

(87) PCT Pub. No.: WO2011/132270
PCT Pub. Date: Oct. 27, 2011

(65) Prior Publication Data
US 2013/0015031 A1  Jan. 17, 2013

(51) Int. Cl.
*F16D 7/02* (2006.01)
*F16F 15/134* (2006.01)

(52) U.S. Cl.
CPC ...................................... *F16D 7/025* (2013.01)
USPC .......................................... 464/46; 464/68.41

(58) Field of Classification Search
USPC ......... 464/42–48, 68.41; 192/55.1, 56.1, 56.2
See application file for complete search history.

(56) References Cited

U.S. PATENT DOCUMENTS

| | | | |
|---|---|---|---|
| 4,562,997 A | | 1/1986 | Iwata et al. |
| 4,696,378 A | * | 9/1987 | Brooks |
| 4,907,683 A | * | 3/1990 | Patel |
| 6,837,354 B2 | * | 1/2005 | Uehara |
| 7,377,853 B2 | * | 5/2008 | Takeuchi et al. ................ 464/46 |
| 8,357,050 B2 | * | 1/2013 | Saeki et al. ..................... 464/46 |
| 2005/0096138 A1 | | 5/2005 | Takeuchi et al. |
| 2009/0294239 A1 | | 12/2009 | Nakagaito et al. |
| 2011/0057368 A1 | | 3/2011 | Tajima et al. |

FOREIGN PATENT DOCUMENTS

| | | |
|---|---|---|
| DE | 197 10 365 A1 | 11/1997 |
| JP | 38 17254 | 8/1963 |
| JP | 48 41471 | 12/1973 |
| JP | 59 40031 | 3/1984 |
| JP | 5 172171 | 7/1993 |
| JP | 2004 19834 | 1/2004 |
| JP | 2005 133859 | 5/2005 |
| JP | 2009 275738 | 11/2009 |
| JP | 2009 293652 | 12/2009 |

OTHER PUBLICATIONS

International Search Report Issued Jun. 29, 2010 in PCT/JP10/57046 Filed Apr. 21, 2010.

* cited by examiner

*Primary Examiner* — Gregory Binda
*Assistant Examiner* — Josh Skroupa
(74) *Attorney, Agent, or Firm* — Oblon, Spivak, McClelland, Maier & Neustadt, L.L.P.

(57) ABSTRACT

A torque limiter mounted on a hybrid vehicle includes an output plate, an input plate including a first region facing a first main surface of the output plate and a second region facing a second main surface of the output plate, a friction member provided on the first main surface of the output plate and disposed between the first main surface and the first region, and a biasing member being in contact with the second main surface of the input plate, for biasing the output plate toward the first region.

5 Claims, 9 Drawing Sheets

TORQUE LIMITER AND POWER TRANSMISSION DEVICE

TECHNICAL FIELD

The present invention relates to a torque limiter and a power transmission device, and particularly to a torque limiter and a power transmission device mounted on a hybrid vehicle.

BACKGROUND ART

Various proposals have heretofore been made regarding torque limiters. For example, the torque fluctuation absorbing device described in Japanese Patent Laying-Open No. 2005-133859 includes a damping mechanism connected to an input shaft of a gearbox, a flywheel to which a driving force from a driving source is transmitted, a first plate and a second plate that rotate integrally with the flywheel, and a disc spring. The damping mechanism includes a disc, a first friction member provided on one side surface of the disc, and a second friction member provided on the other side surface of the disc. The first plate abuts on the first friction member, and the second plate contacts the second friction member. The disc spring biases the second plate against the second friction member.

The torque fluctuation absorbing device described in Japanese Patent Laying-Open No. 2009-293652 also includes friction members provided on opposing surfaces of an output-side plate member, a pressure plate that contacts one of the friction members, and a disc spring for pressing this pressure plate against the friction member.

CITATION LIST

Patent Literature

PTL 1: Japanese Patent Laying-Open No. 2005-133859
PTL 2: Japanese Patent Laying-Open No. 2009-293652

SUMMARY OF INVENTION

Technical Problem

In the torque fluctuation absorbing device described in Japanese Patent Laying-Open No. 2005-133859, the disc spring biases the second plate against the friction member, whereby the second plate and the friction member are brought into contact with each other. When a torque with a predetermined value or higher is applied to this torque fluctuation absorbing device, the second plate and the second friction member begin rotating relative to each other.

If rust forms between the first plate and the first friction member or between the second plate and the second friction member, adhesion strength between the first plate and the first friction member or between the second plate and the second friction member increases. Thus, where an input torque with a predetermined value or higher is applied to the torque fluctuation absorbing device, an increased torque is directly transmitted to the gearbox. This may result in abrasion of tooth surfaces of the gearbox, and poor tooth contact, thus leading to poor NV (Noise and Vibration) characteristics.

Similarly in the torque fluctuation absorbing device described in Japanese Patent Laying-Open No. 2009-293652, if the pressure plate and the friction member adhere to each other, an increased torque may be directly input to the gearbox. Input of such an increased torque to the gearbox may cause abrasion of tooth surfaces of the gearbox, and poor tooth contact, thus leading to poor NV characteristics.

The present invention was made in view of the problems as described above, and an object of the invention is to provide a torque limiter and a power transmission device in which adhesion due to rust or the like is prevented from occurring.

Solution to Problem

A torque limiter according to the present invention is mounted on a hybrid vehicle and provided within a power transmission path through which motive power is transmitted from a drive unit, for relieving motive power transmitted when excessive motive power is applied to the power transmission path. The torque limiter includes a first rotating member including a first main surface and a second main surface located opposite to the first main surface, a second rotating member including a first region facing the first main surface of the first rotating member and a second region facing the second main surface of the first rotating member, a transmission member provided between the first main surface and the first region and capable of transmitting motive power to the first rotating member from the second rotating member, and a biasing member provided between the second main surface and the second region. The biasing member is in contact with the second main surface, for biasing the first rotating member toward the first region, thereby pressing the transmission member against the first region. A contact area between the biasing member and the first rotating member is smaller than that between the transmission member and the first region.

Preferably, an annular groove is formed in the second main surface, and an end of the biasing member facing the second main surface enters within the groove. Preferably, the biasing member includes a disc spring main body having a hollow truncated conical shape, and a contact piece provided at a tip portion of the disc spring main body. The contact piece is formed to project toward the first rotating member more than the tip portion of the disc spring main body. Preferably, the torque limiter further includes an annular sealing member provided on the second main surface. The biasing member has an annular shape, a space is formed by the sealing member, the second main surface, and the biasing member, and the space is filled with a lubricant. Preferably, the drive unit is an engine. Preferably, the first rotating member and the second rotating member are made of metal. A power transmission device according to the present invention includes the above-described torque limiter.

Advantageous Effects of Invention

With the torque limiter and the power transmission device according to the present invention, adhesion can be prevented.

DESCRIPTION OF EMBODIMENTS

Torque limiters and power transmission devices according to the present invention will be described using FIG. 1 through FIG. 9. Embodiments of this invention will hereinafter be described in detail with reference to the drawings. In the following description, identical or corresponding parts are denoted by identical numerals, and the description thereof will not be repeated.

First Embodiment

Figure 1:
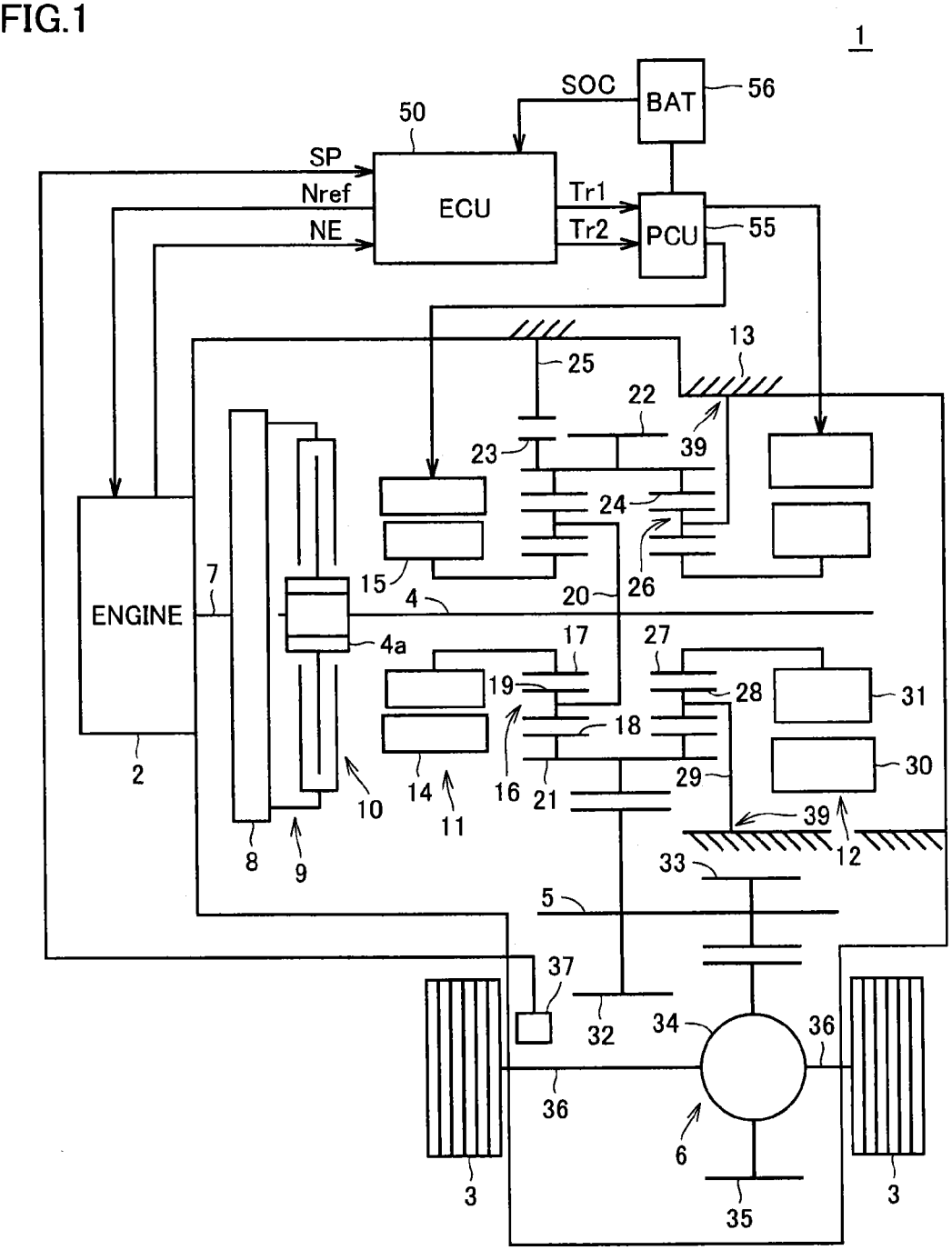
FIG. 1 is a conceptual diagram showing a powertrain of a hybrid vehicle 1 and a control system therefor.

FIG. 1 is a conceptual diagram showing a powertrain of an FF (Front engine Front drive) hybrid vehicle 1 and a control system therefor according to a first embodiment of this invention.

With reference to FIG. 1, hybrid vehicle 1 includes an engine 2, a power transmission device 9, a power split device (reduction gear) 16, motor generators 11 and 12, a driven gear 32, a final drive pinion gear 33, a differential case 34, a driveshaft 36, and a wheel 3. Motive power from engine (drive unit) 2 is transmitted to wheel 3 sequentially through power transmission device 9, power split device 16, driven gear 32, final drive pinion gear 33, differential case 34, driveshaft 36, and the like. Power transmission device 9, power split device (reduction gear) 16, motor generators 11 and 12, driven gear 32, final drive pinion gear 33, and differential case 34 are accommodated within a casing 13.

An internal combustion engine, which is specifically a gasoline engine, a diesel engine, an LPG engine, a methanol engine, a hydrogen engine, or the like, may be used as engine 2. Engine 2 includes a crankshaft 7, which is rotated when engine 2 is driven.

Power transmission device 9 is provided within a power transmission path through which motive power from engine 2 is transmitted, and in particular, a power transmission path located between engine 2 and power split device 16. Power transmission device 9 interrupts (relieves) an input torque transmitted when excessive motive power is applied to the power transmission path. Power transmission device 9 includes flywheel 8 and a torque limiter 10 connected to flywheel 8. Flywheel 8 is fixed to crankshaft 7 of engine 2, and rotates when crankshaft 7 rotates. Torque limiter 10 is provided so that input shaft 4 of power split device 16 is connected to flywheel 8.

Torque limiter 10 is an interruption device having a friction member for interrupting an overload on power split device 16, and protects power split device 16 by interrupting (relieving) an excessively acting input torque.

Motor generators 11 and 12 are provided outside input shaft 4. Each of motor generators 11 and 12 functions both as an electric motor that is driven by supply of electric power, and as an electric motor for converting kinetic energy into electrical energy (regenerative function).

A power storage device (BAT) 56 for supplying electric power to motor generators 11 and 12 is also provided. A battery or a capacitor may be used as power storage device 56.

Motor generator 11 has a stator 14 fixed to casing 13 (not shown) and a rotable rotor 15.

Power split device 16 is provided between motor generator 11 and motor generator 12, outside input shaft 4. Power split device 16 is implemented by a so-called single pinion-type planetary gear mechanism.

Power split device 16 has a sun gear 17, a ring gear 18 disposed concentrically with sun gear 17, and a carrier 20 for holding a pinion gear 19 that meshes with sun gear 17 and ring gear 18. Sun gear 17 and rotor 15 are connected such that they rotate integrally, and carrier 20 and input shaft 4 are connected such that they rotate integrally.

Ring gear 18 is formed on an inner periphery of an annular member 21. A gear 22 and a parking gear 23 are formed on an outer periphery of annular member 21, and a ring gear 24, which is different from ring gear 18, is formed on the inner periphery of annular member 21. Moreover, a parking ball 25, which is engageable with parking gear 23 and is detachable from parking gear 23, is provided within casing 13.

Further, a planetary gear 26 is provided outside input shaft 4. Planetary gear 26 has a sun gear 27, ring gear 24, and a carrier 29 for holding a pinion gear 28 meshed with sun gear 27 and ring gear 24.

Motor generator 12 has a stator 30 fixed to casing 13 (not shown) and a rotable rotor 31. Sun gear 27 and rotor 31 are connected such that they rotate integrally. Engine 2 and motor generator 12 are disposed in parallel with each other, with annular member 21 connected to wheel 3 as described above being interposed therebetween.

Carrier 29 is fixed to casing 13. Specifically, a connected portion 39 between carrier 29 and casing 13 serves as a detent for carrier 29. Connected portion 39 has a radially projecting portion (not shown) and a recessed portion (not shown) in which the projecting portion is disposed.

Input shaft 4 and an output shaft 5 are disposed in parallel with each other, and driven gear 32 and final drive pinion gear 33 are formed on output shaft 5. Gear 22 and driven gear 32 are meshed with each other.

Further, a differential gear 6 has differential case 34 rotatable about a rotation axis in parallel with that (not shown) of output shaft 5, a ring gear 35 formed on an outer periphery of differential case 34, a pinion gear (not shown) held within differential case 34, and a side gear (not shown) fit into the pinion gear. Ring gear 35 and final drive pinion gear 33 are fit into each other.

The side gear is connected to a driveshaft 36, which in turn is connected to wheel 3. A vehicle speed sensor 37 for detecting a rotation speed of wheel 3 is provided close to driveshaft 36.

The control system for hybrid vehicle 1 will be described next. First, an electronic control unit (ECU) 50 is provided, and electronic control unit 50 is implemented by a microcomputer mainly including an operation processing unit (CPU or MPU), memory storage units (RAM and ROM), and an input/output interface. Electronic control unit 50 receives input of a signal from vehicle speed sensor 37, a signal from a charge amount sensor for power storage device 56, a signal from an engine speed sensor, a signal from an acceleration request sensor, a signal from a braking request sensor, a signal from a shift position sensor, etc. In FIG. 1, a vehicle speed SP from vehicle speed sensor 37, an engine speed NE from the engine speed sensor, and a charge state value SOC from the charge amount sensor for power storage device 56 are shown as the above-described signals by way of example.

Electronic control unit 50, on the other hand, outputs a signal for controlling engine 2, a signal for controlling motor generators 11 and 12, etc. In FIG. 1, a target torque value Tr1 for motor generator 11, a target torque value Tr2 for motor generator 12, and a target engine speed value Nref for engine 2 are shown as the above-described signals by way of example.

A power control unit (PCU) 55, which includes a power converter for converting DC electric power supplied from power storage device 56 into electric power for driving motor generators 11 and 12, serves to supply AC electric power at which target torque values Tr1, Tr2 can be realized to motor generators 11 and 12.

In thus-configured hybrid vehicle 1, engine 2, motor generator 11, and motor generator 12 are controlled based on the signals input to electronic control unit 50 and data stored in electronic control unit 50.

When engine 2 is started, for example, motor generator 11 is operated as an electric motor. Ring wheel 18 of power split device 16 then serves as a reaction element, and torque of motor generator 11 is transmitted to engine 2 through carrier 20 and input shaft 4, whereby engine 2 is cranked.

In this way, engine 2 is cranked and fuel combustion takes place, allowing autonomous rotation of engine 2. When engine 2 autonomously rotates, torque of engine 2 is transmitted to gear 22 through input shaft 4, carrier 20, and ring gear 18. Torque of gear 22 is transmitted to wheel 3 through output shaft 5 and differential gear 6, whereby driving force is generated.

Moreover, electric power can be generated by motor generator 11 with the output from engine 2, and power storage device 56 can be charged with the generated electric power. Furthermore, motor generator 12 can be driven as an electric motor, and the torque can be transmitted to wheel 3 through sun gear 27, ring gear 24, and gear 22. Where torque of motor generator 12 is transmitted to ring gear 24, the direction of rotation of motor generator 12 is reverse to that of ring gear 24.

As described above, hybrid vehicle 1 shown in FIG. 1 can run by using at least one of engine 2 and motor generator 12 as a source of driving force, and by transmitting the torque to wheel 3.

Moreover, while the hybrid vehicle is coasting, kinetic energy of hybrid vehicle 1 can be transmitted to motor generator 12 through differential gear 6, output shaft 5, and gear 22, and motor generator 12 can serve as a power generator, so that power storage device 56 can be charged with the generated electric power.

Figure 2:
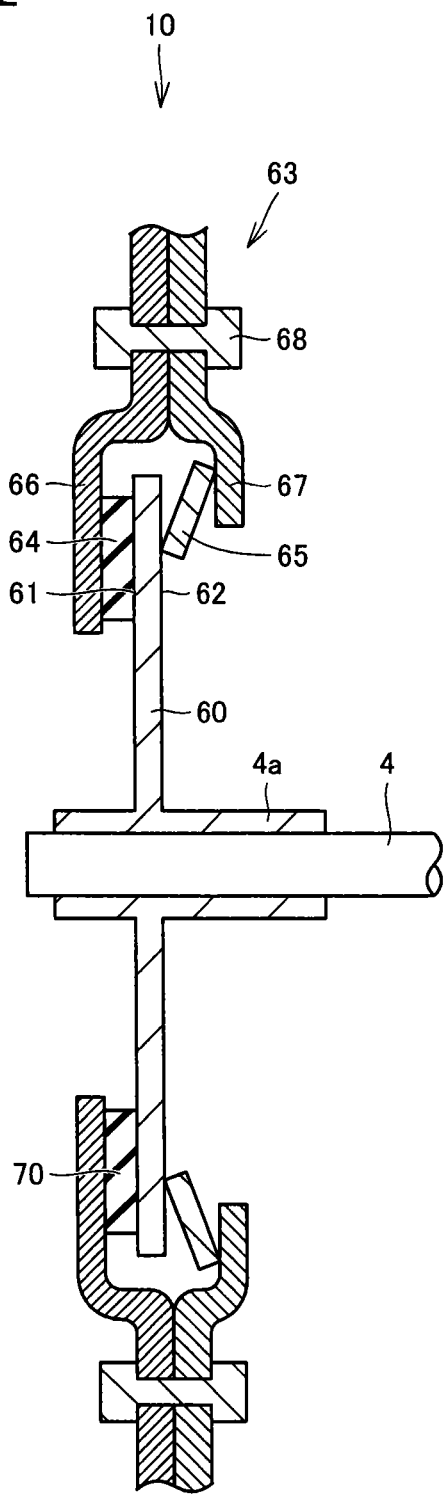
FIG. 2 is a cross-sectional view of a torque limiter according to a first embodiment of the invention.

FIG. 2 is a cross-sectional view of torque limiter 10 according to the present embodiment. As shown in FIG. 2, torque limiter 10 includes a sleeve 4a spline-fit to input shaft 4, an output plate (first rotating member) 60 formed to protrude from a peripheral surface of sleeve 4a and having a main surface 61 and a main surface 62, an input plate (second rotating member) 63 connected to crankshaft 7 with flywheel 8 interposed therebetween, a friction member (transmission member) 64 provided on main surface 61, and a disc spring (biasing member) 65. Sleeve 4a is spline-fit to input shaft 4. Output plate 60 has a plate shape, and main surfaces 61 and 62 are disposed to face each other. Although output plate 60 typically has a disc shape, any of various shapes can be adopted as the shape of output plate 60.

Friction member 64 is fixed to main surface 61, has a circular shape around the center line of input shaft 4, and is composed of resin, for example. Disc spring 65, input shaft 4 has a hollow truncated conical shape. Disc spring 65 is also disposed such that its center line corresponds to the center line of input shaft 4.

An input plate 63 includes an opposing plate (first region) 66 disposed to face main surface 61 and an opposing plate 67 disposed to face main surface 62, and opposing plates 66 and 67 are connected to each other with a rivet (fixing member) 68. Input plate 63 is disposed to cover an outer peripheral edge of output plate 60.

Disc spring 65 is disposed between main surface 62 of output plate 60 and opposing plate 67. Disc spring 65 is pressing output plate 60 toward opposing plate 66, and friction member 64 is being pressed against opposing plate 66. Sleeve 4a is spline-fit to input shaft 4.

In a normal running state, motive power from engine 2 is applied to input plate 63, causing input plate 63 to rotate. The motive power applied to input plate 63 is transmitted to output plate 60 through friction member 64, causing output plate 60 to rotate. Rotation of output plate 60 causes input shaft 4 to rotate, whereby motive power from the engine is transmitted to power split device 16.

As shown in FIG. 1, torque limiter 10 is mounted on a so-called hybrid vehicle, and motive power from motor generators 12, 11 and engine 2 is applied to power split device 16.

In torque limiter 10, when motive power transmitted to input shaft 4 from crankshaft 7 becomes excessive, slip occurs between friction member 64 and opposing plate 66, whereby motive power to be transmitted to output plate 60 from opposing plate 66 is interrupted (relieved). Disc spring 65 is fixed to opposing plate 67, such that when slip occurs between friction member 64 and opposing plate 66, slip occurs also between disc spring 65 and output plate 60.

A threshold value at which torque limiter 10 is driven is set to be greater than a maximum output of engine 2. Torque limiter 10 is driven when, for example, resonance occurs in input shaft 4 or the like due to running of hybrid vehicle 1 on a wavy road, for example. Torque limiter 10 is thus not driven during normal running, and is driven in only a few cases. Even if torque limiter 10 mounted on the hybrid vehicle is driven, output plate 60 and friction member 64 are rotated only slightly relative to disc spring 65 and input plate 63. Since the amount of rotation of output plate 60 relative to disc spring 65 is small, disc spring 65 undergoes little abrasion even though disc spring 65 is brought into direct contact with output plate 60.

Figure 3:
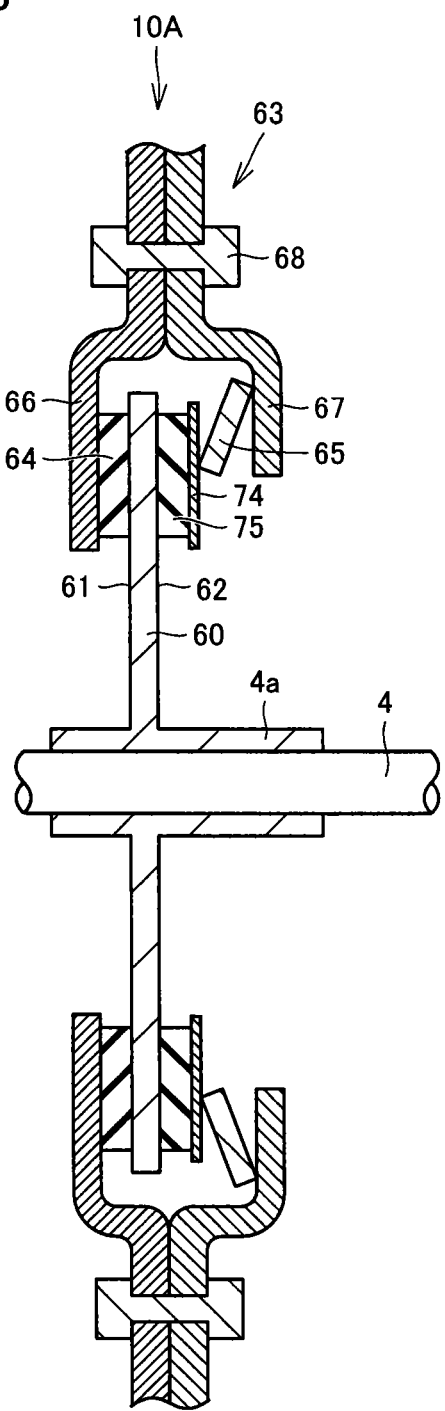
FIG. 3 is a cross-sectional view showing a torque limiter as a comparative example.

FIG. 3 is a cross-sectional view showing torque limiter 10A as a comparative example. As with torque limiter 10 according to the first embodiment of the invention, torque limiter 10A shown in FIG. 3 includes input plate 63 having opposing plates 66 and 67, and output plate 60. Torque limiter 10A further includes friction member 75 that is provided on main surface 62 of output plate 60, friction member 64 provided on main surface 61 of output plate 60, disc spring 65 fixed to opposing plate 67, and a pressing member 74 that is joined to opposing plate 67 and is pressed toward friction member 75 by disc spring 65.

In the course of the path through which motive power is transmitted to output plate 60 from input plate 63, in each of a contact portion between friction member 64 and opposing plate 66 and a contact portion between pressing member 74 and friction member 75, the respective two members are in contact with each other so as to be movable relative to each other. Thus, if rust forms in the contact portion between friction member 64 and opposing plate 66 or in the contact portion between pressing member 74 and friction member 75, the respective two members adhere to each other, which increases the threshold value at which torque limiter 10A is operated.

In torque limiter 10 according to the first embodiment of the invention shown in FIG. 2, in each of a contact portion between friction member 64 and opposing plate 66 and a contact portion between disc spring 65 and output plate 60, the respective two members are in contact with each other so as to be movable relative to each other. Torque limiter 10 according to the first embodiment of the invention and torque limiter 10A of the comparative example are common in that friction member 64 and opposing plate 66 are in contact with each other. In torque limiter 10 according to the first embodiment of the invention, however, output plate 60 and disc spring 65 are in linear contact with each other, while pressing member 74 and friction member 75 are in surface contact with each other in torque limiter 10A.

Therefore, in the path through which motive power is transmitted to output plate 60 from input plate 63, the area where the members are in contact with each other so as to be movable relative to each other is smaller in torque limiter 10 than in torque limiter 10A.

Since adhesion strength due to rust increases as the contact area between the members increases, even if rust forms in torque limiter 10 and torque limiter 10A, adhesion strength due to rust will be smaller in torque limiter 10 than in torque limiter 10A.

Specifically, in the case of rust formation, adhesion strength created between output plate 60 and disc spring 65 in the first embodiment of the invention is smaller than that between pressing member 74 and friction member 75 in the comparative example.

As a result, in torque limiter 10 according to the first embodiment of the invention, even if rust forms in each contact portion, the threshold value at which torque limiter 10 is operated can be prevented from becoming excessive. Therefore, when a torque with a predetermined value or higher is applied to torque limiter 10, disc spring 65 and output plate 60 slip relative to each other, thereby preventing an increased input torque from being transmitted to power split device 16.

Furthermore, as compared to torque limiter 10A of the comparative example, torque limiter 10 according to the first embodiment of the invention does not include friction member 75 and pressing member 74, thus achieving a reduced number of components.

Since the contact area between friction member 64 and opposing plate 66 is larger than that between disc spring 65 and output plate 60, the contact pressure to be applied to friction member 64 can be prevented from becoming excessive, thereby preventing abrasion of friction member 64 from proceeding.

The contact portion between disc spring 65 and output plate 60, and a central portion in a width direction between an inner peripheral edge and an outer peripheral edge of friction member 64 are aligned in an axial direction of input shaft 4. Furthermore, since the center line of friction member 64 and the center line of disc spring 65 correspond to the rotational center line of input shaft 4, pressing force from disc spring 65 is distributed substantially uniformly throughout friction member 64, and the side surface of friction member 64 is brought into uniform contact with opposing plate 66. As a result, a substantially equal contact pressure is applied to the contact portion between friction member 64 and opposing plate 66, thereby preventing local abrasion of friction member 64.

Output plate 60 is formed of a metal material harder than that of disc spring 65. This prevents abrasion of the portion of main surface 62 that is brought into contact with disc spring 65, thus preventing a depression or a gap due to abrasion from being formed in main surface 62.

As described above, since the frequency of driving torque limiter 10 is low, even if the tip portion of disc spring 65 is abraded, the pressing force of disc spring 65 undergoes little change.

As described above, with torque limiter 10 according to the present embodiment, fluctuations in limiter torque due to adhesion can be prevented, and a reduced number of components can be achieved as compared to conventional torque limiters.

Second Embodiment

Torque limiter 10 according to the second embodiment of the invention will be described using FIGS. 4 and 5. Among the components shown in FIGS. 4 and 5, components identical or corresponding to those shown in FIGS. 1 and 2 above may be denoted by identical numerals, and the description thereof may not be repeated. Torque limiter 10 according to the second embodiment of the invention is also mounted on hybrid vehicle 1 as shown in FIG. 1 above.

Figure 4:
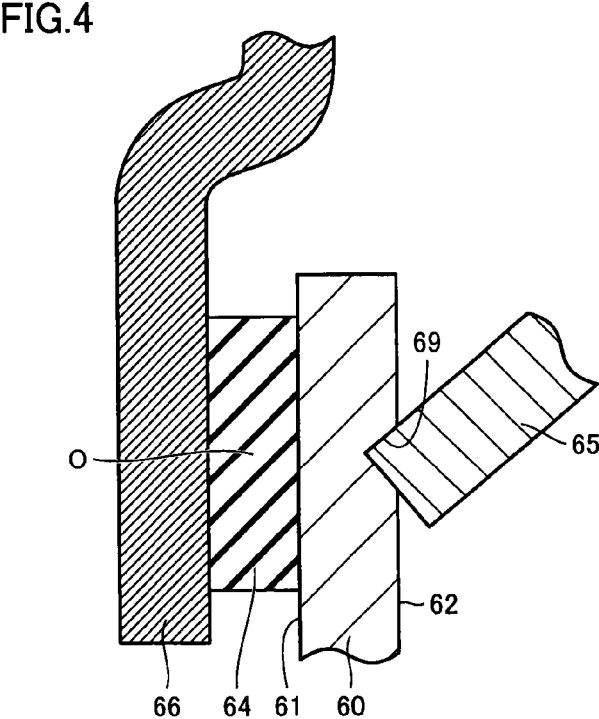
FIG. 4 is a cross-sectional view showing a portion of a torque limiter according to a second embodiment of the invention.
Figure 5:
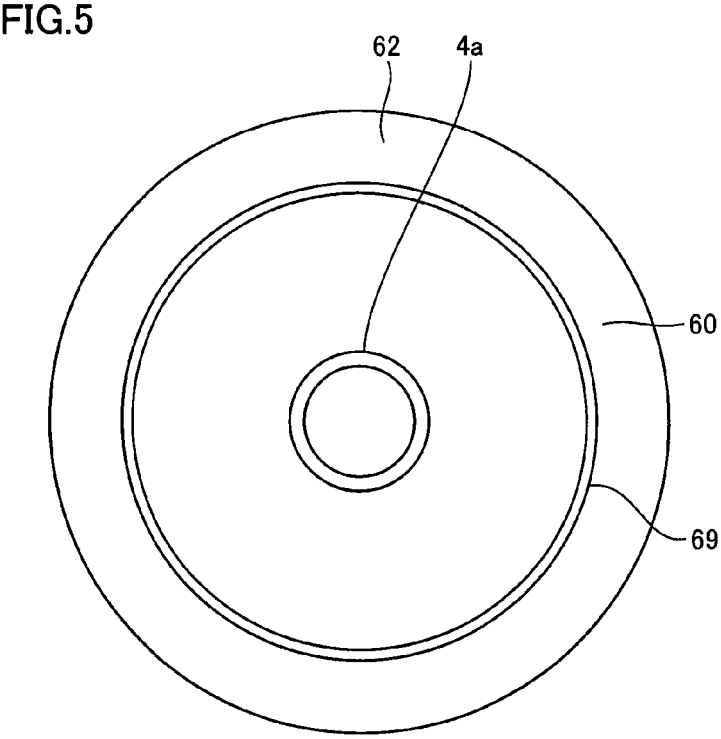
FIG. 5 is a plan view of an output plate.

In FIGS. 4 and 5, a groove 69 extending annularly about input shaft 4 is formed in main surface 62 of output plate 60, and a tip portion of disc spring 65 facing output plate 60 is received within groove 69.

Disc spring 65 is brought into contact with a surface of output plate 60 provided with groove 69, and is also pressing against the surface.

A central portion of a contact portion between the tip portion of disc spring 65 and the surface of output plate 60 provided with groove 69, and a central portion O between the outer peripheral edge and the inner peripheral edge of friction member 64 align in the axial direction of input shaft 4.

Accurate positioning between disc spring 65 and output plate 60 can be achieved with groove 69, thereby allowing disc spring 65 and friction member 64 to be also accurately positioned relative to each other. This allows uniform contact of friction member 64 with opposing plate 66, thereby preventing local abrasion of friction member 64.

When output plate 60 and disc spring 65 rotate relative to each other, the tip portion of disc spring 65 moves within groove 69. Thus, even if disc spring 65 and output plate 60 move relative to each other, change in the positional relationship between disc spring 65 and friction member 64 can be prevented.

Third Embodiment

Torque limiter 10 according to the third embodiment of the invention will be described using FIGS. 6 and 7. Among the components shown in FIGS. 6 and 7, components identical or corresponding to those shown in FIGS. 1 through 5 above may be denoted by identical numerals, and the description thereof may not be repeated.

Figure 6:
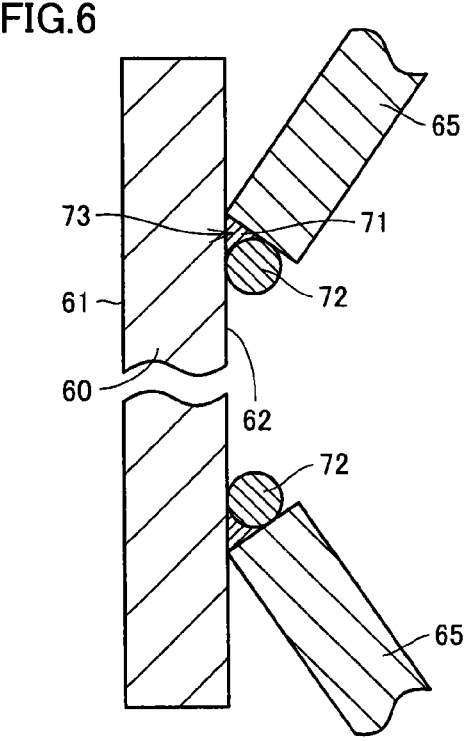
FIG. 6 is a cross-sectional view showing a portion of a torque limiter according to a third embodiment of the invention.
Figure 7:
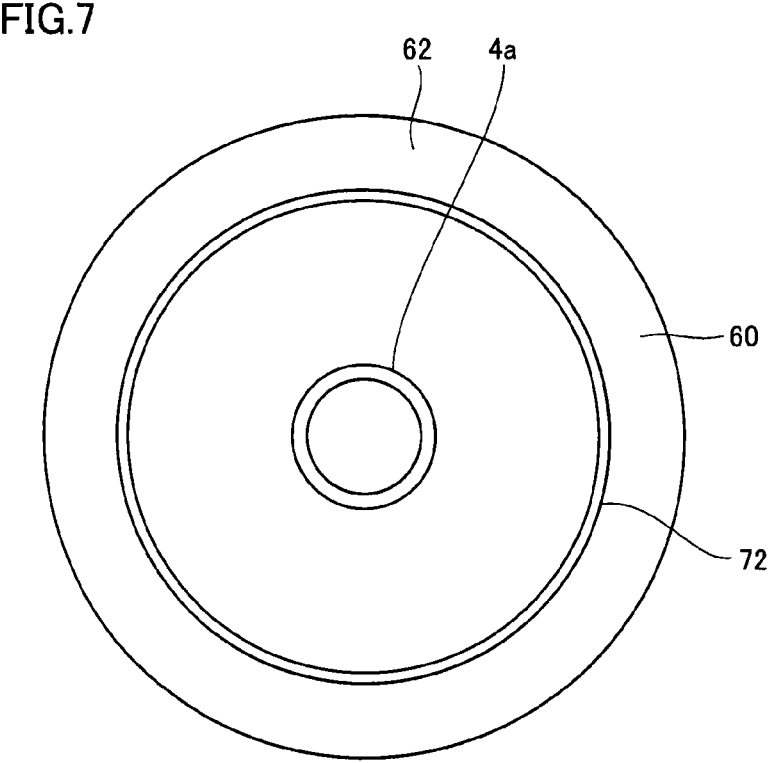
FIG. 7 is a plan view of an output plate.

In FIGS. 6 and 7, torque limiter 10 is provided on main surface 62 of output plate 60, and further includes a sealing member 72 having an annular shape, as shown in FIG. 7. An O-ring, for example, is adopted as sealing member 72.

A space 73 extending annularly is formed by sealing member 72, a tip portion of disc spring 65, and main surface 62 of output plate 60. The tip portion of disc spring 65 abuts on main surface 62 of output plate 60. A tip surface of disc spring 65 is formed toward input shaft 4 away from main surface 62 from its position of contact with main surface 62.

Sealing member 72 is inserted into an annular corner defined by the tip surface of disc spring 65 and main surface 62. In this way, space 73 extending annularly is formed by sealing member 72, main surface 62, and the tip surface of disc spring 65.

Space 73 is filled with a lubricant 71, such as grease. Since space 73 is filled with lubricant 71, disc spring 65 and output plate 60 are prevented from being heated to high temperature when torque limiter 10 is driven. Furthermore, abrasion of disc spring 65 and output plate 60 can be prevented.

Fourth Embodiment

Torque limiter 10 according to the fourth embodiment of the invention will be described using FIGS. 8 and 9. Among the components shown in FIGS. 8 and 9, components identical or corresponding to those shown in FIGS. 1 through 7 above may be denoted by identical numerals, and the description thereof may not be repeated.

Figure 8:
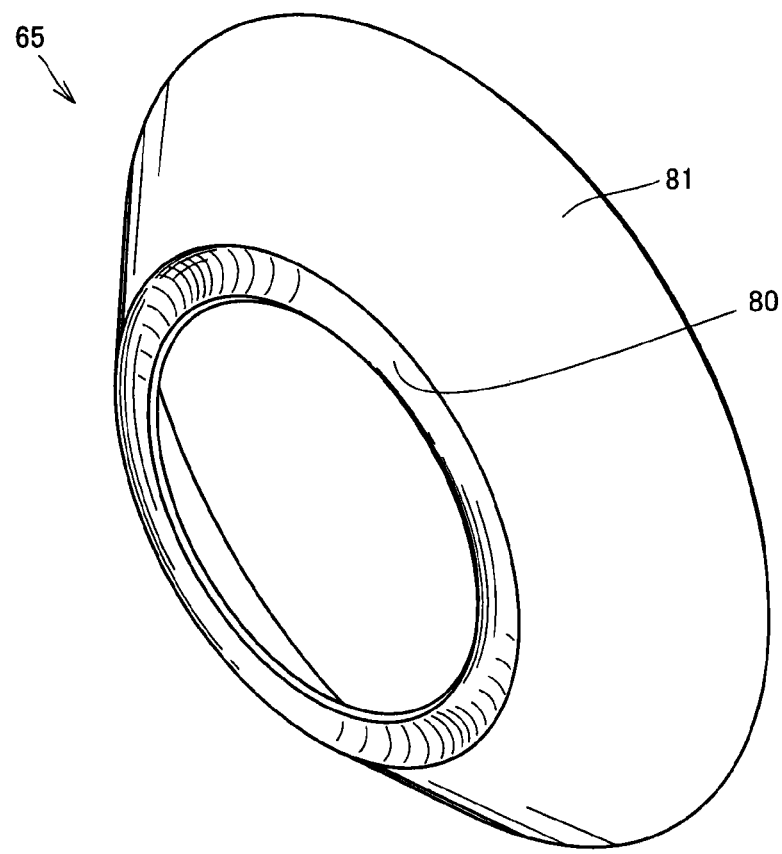
FIG. 8 is a perspective view showing a disc spring provided in a torque limiter according to a fourth embodiment of the invention.

FIG. 8 is a perspective view showing disc spring 65 provided in torque limiter 10 according to the fourth embodiment of the invention. As shown in FIG. 8, disc spring 65 includes a disc spring main body 81 having a hollow truncated conical shape, and a contact piece 80 formed at a tip portion of disc spring main body 81.

A circular opening is formed in the tip portion of disc spring main body 81, and contact piece 80 is formed around an opening edge of disc spring main body 81.

Figure 9:
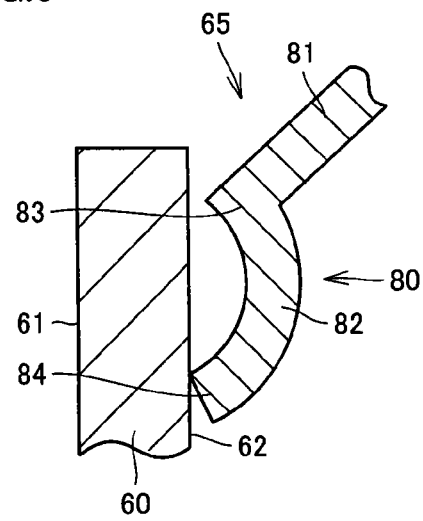
FIG. 9 is a cross-sectional view showing a tip portion of the disc spring.

FIG. 9 is a cross-sectional view partially showing the tip portion of disc spring 65 and output plate 60. As shown in FIG. 9, contact piece 80 is formed to protrude from the opening edge of disc spring main body 81 radially inwardly of disc spring 65.

Contact piece 80 has a root portion 83 on an outer peripheral side connected to the tip portion of disc spring main body 81. A tip portion 84 of contact piece 80 located on an inner peripheral side is in contact with main surface 62 of output plate 60. Tip portion 84 is formed to project toward output plate 60 more than root portion 83, so that during assembly of torque limiter 10, tip portion 84 and output plate 60 can be securely brought into contact with each other.

Contact piece 80 includes a curved portion 82 having a curved surface shape, and curved portion 82 is formed farthest away from output plate 60 in a central portion between root portion 83 and tip portion 84.

A space into which oil can enter is formed by curved portion 82 and main surface 62 of output plate 60. The oil is stored in the bottom of casing 13 shown in FIG. 1, and is pumped up with the gears or the like. The pumped oil enters between curved portion 82 and output plate 60.

Contact piece 80 is formed on disc spring main body 81 in a cantilevered state. When disc spring 65 is disposed closer to output plate 60 than a predetermined position, contact piece 80 is bent, and at least tip portion 84 is brought into contact with output plate 60.

Although an example where the invention is applied to a hybrid vehicle that adopts a so-called series/parallel system has been described in each of the first to fourth embodiments of the invention, the invention can also be applied to a hybrid vehicle that adopts a parallel system or a series-type hybrid vehicle.

Fifth Embodiment

The fifth embodiment in which the invention is applied to a parallel-type hybrid vehicle will be described using FIGS. 10 to 12. Among the components shown in FIGS. 10 to 12, components identical or corresponding to those shown in FIGS. 1 and 9 above may be denoted by identical numerals, and the description thereof may not be repeated.

Figure 10:
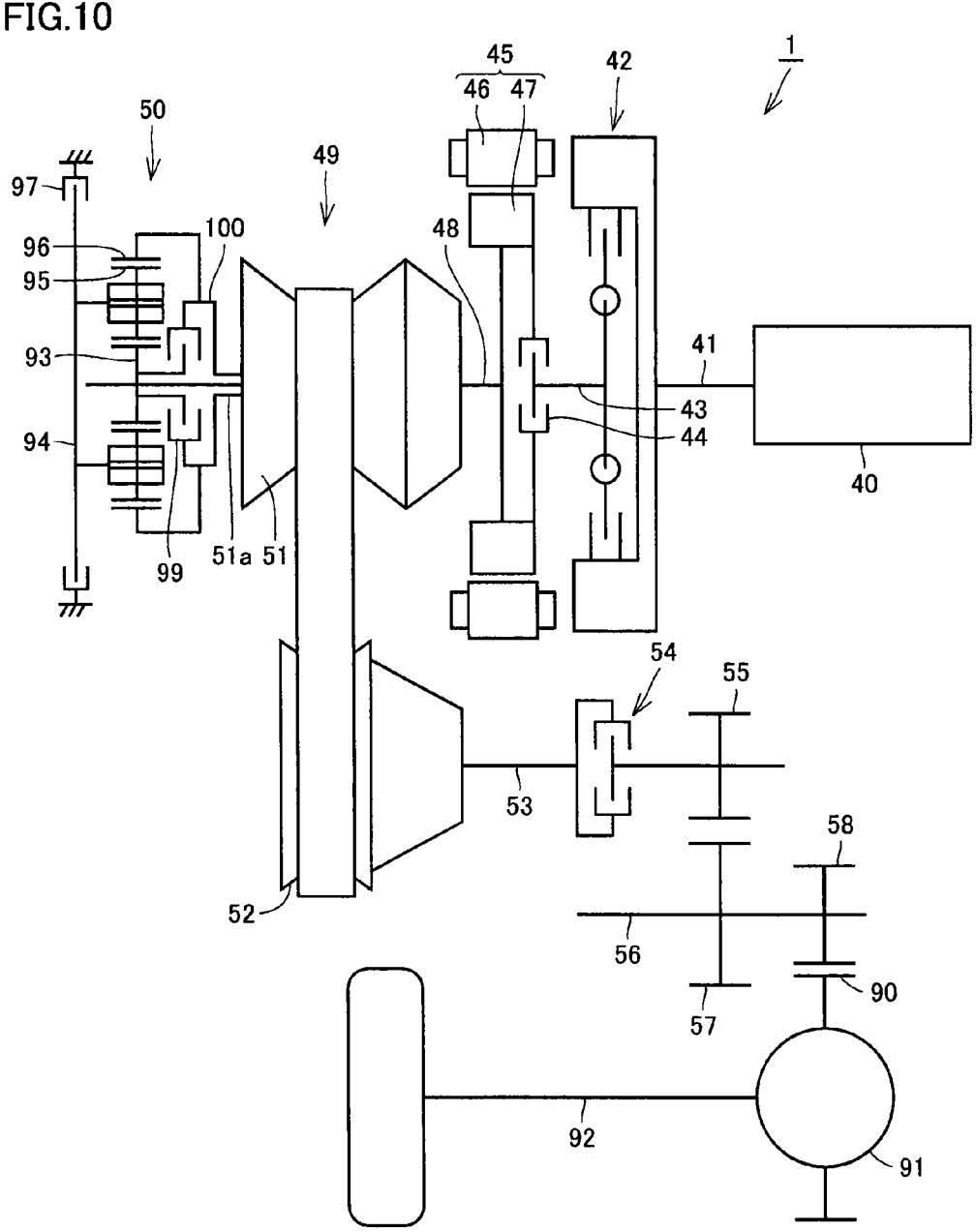
FIG. 10 is a skeleton diagram schematically showing a structure of a hybrid vehicle 1 according to a fifth embodiment of the invention.

FIG. 10 is a skeleton diagram schematically showing a structure of hybrid vehicle 1 according to the fifth embodiment of the invention. As shown in FIG. 10, hybrid vehicle 1 includes an engine 40, a torque limiter-equipped flywheel (power transmission device) 42 connected to a crankshaft 41 of engine 40, a flywheel shaft 43 having one end connected to torque limiter-equipped flywheel 42, and an engine disconnecting clutch 44 connected to the other end of flywheel shaft 43.

Hybrid vehicle 1 further includes a motor generator 45 connected to engine disconnecting clutch 44 and a main shaft 48, a gearbox 49, and a forward/reverse switch mechanism 50 provided on an end of main shaft 48.

Hybrid vehicle 1 includes a counter shaft 53 connected to a driven pulley 52 of gearbox 49, a forward-drive clutch 54 provided on counter shaft 53, a first reduction gear 55 connected to forward-drive clutch 54, a reduction shaft 56 having a second reduction gear 57 that meshes with first reduction gear 55, a final drive gear 58 provided on reduction shaft 56, a differential gear 91 having a final driven gear 90 that meshes with final drive gear 58, and a driveshaft 92 connected to differential gear 91.

Motor generator 45 includes a stator 46 and a rotor 47, and rotor 47 is connected to engine disconnecting clutch 44 and main shaft 48.

Gearbox 49 includes a drive pulley 51, driven pulley 52, and a metal belt connecting drive pulley 51 and driven pulley 52. Drive pulley 51 is fixed to an outer peripheral surface of a sleeve 51a, which is provided on an outer peripheral surface of main shaft 48. Sleeve 51a is rotatably provided about main shaft 48.

Drive pulley 51 is connected to forward/reverse switch mechanism 50. Forward/reverse switch mechanism 50 causes drive pulley 51 to rotate in a direction of forward rotation with respect to the rotation direction of main shaft 48, or causes drive pulley 51 to rotate in a direction of reverse rotation with respect to the rotation direction of main shaft 48.

Forward-drive clutch 54 is a wet multiple disc clutch, and connects first reduction gear 55 and counter shaft 53, or releases the connection between first reduction gear 55 and counter shaft 53.

Motive power from engine 40 is transmitted to a driving wheel sequentially through crankshaft 41, torque limiter-equipped flywheel 42, flywheel shaft 43, motor generator 45, main shaft 48, forward/reverse switch mechanism 50, gearbox 49, counter shaft 53, forward-drive clutch 54, first reduction gear 55, second reduction gear 57, final drive gear 58, final driven gear 90, differential gear 91, and driveshaft 92.

When the driving wheel is driven with motive power from motor generator 45 only, the engagement of engine disconnecting clutch 44 is released. This prevents motive power from motor generator 45 from being transmitted to engine 40, thus achieving reduction in power consumption of motor generator 45.

Moreover, during regenerative braking of motor generator 45, engine disconnecting clutch 44 is connected, thus achieving improved energy recovery efficiency.

Forward/reverse switch mechanism 50 includes a sun gear 93 fixed to carrier 20, a planetary carrier 94 provided to be rotatable relative to main shaft 48, a plurality of pinion gears 95 rotatably provided on planetary carrier 94 and meshing with sun gear 93, and a ring gear 96 that meshes with pinion gears 95.

Forward/reverse switch mechanism 50 further includes a backward-drive clutch 97 provided between the case and planetary carrier 94, a clutch guide 100 connecting sleeve 51*a* and ring gear 96, and a forward-drive clutch provided between clutch guide 100 and sun gear 93.

Engagement of forward-drive clutch 99 causes sun gear 93 and sleeve 51*a* to be joined to each other, and rotation of main shaft 48 is directly transmitted to sleeve 51*a*. Main shaft 48 and sleeve 51*a* then rotate in the same direction at the same speed. A forward gear stage is thus established.

Engagement of backward-drive clutch 97 causes planetary carrier 94 to be fixed to the case, whereby rotation of sun gear 93 is decelerated by pinion gear 95 and becomes reverse rotation, which is transmitted to ring gear 96. Rotation of ring gear 96 is then transmitted to sleeve 51*a* through clutch guide 100. The rotation direction of sleeve 51*a* thus becomes reverse to that of main shaft 48, and sleeve 51*a* rotates at a speed lower than that of main shaft 48.

Figure 11:
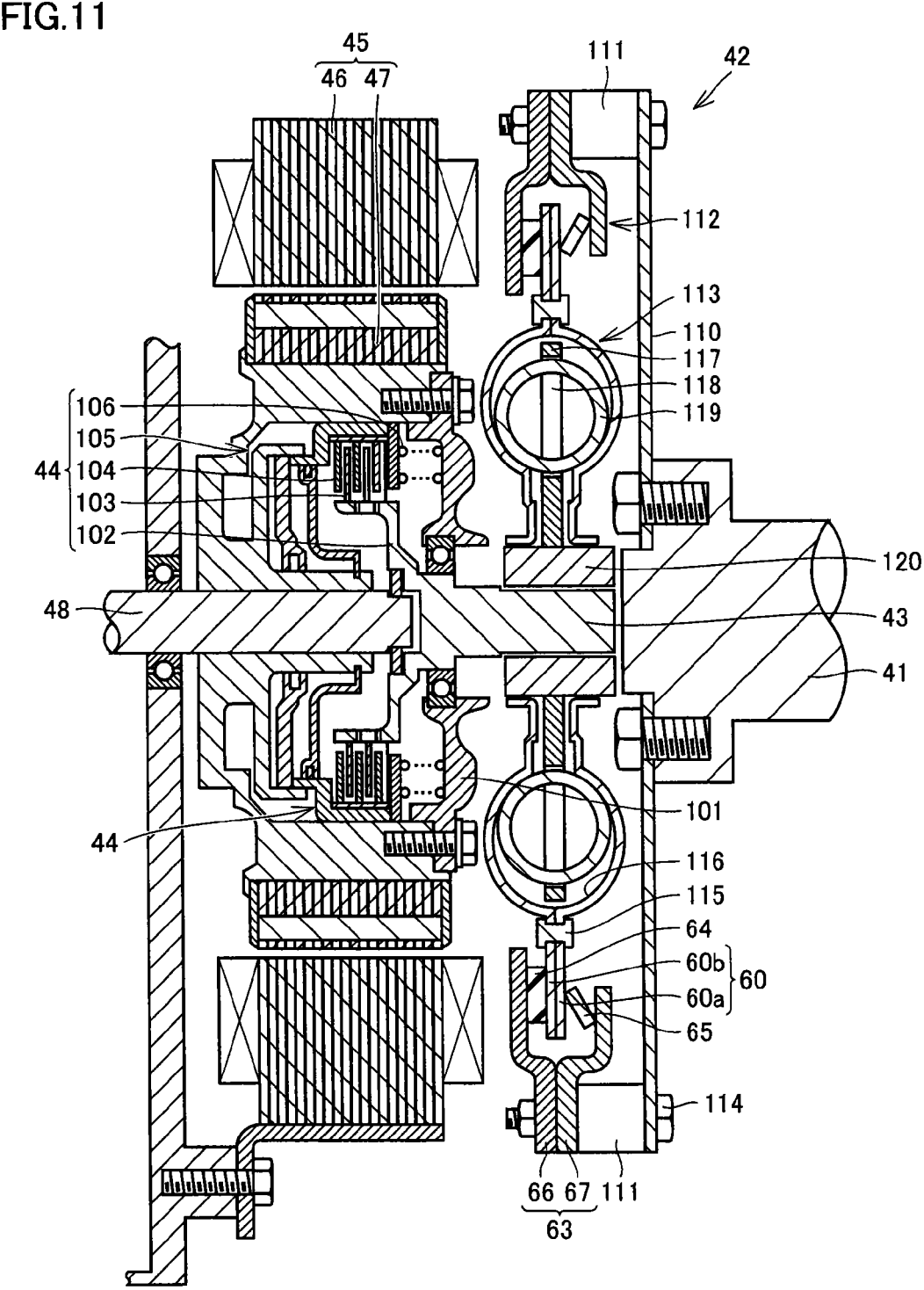
FIG. 11 is a cross-sectional view showing a torque limiter-equipped flywheel, a motor generator, and an engine disconnecting clutch.

FIG. 11 is a cross-sectional view showing torque limiter-equipped flywheel 42, motor generator 45, and engine disconnecting clutch 44. As shown in FIG. 11, flywheel shaft 43 has a blocking member 101 with a ball bearing interposed therebetween. Blocking member 101 is fixed to rotor 47 with a bolt.

Engine disconnecting clutch 44 includes a clutch hub 102 formed on an end of flywheel shaft 43 and formed to protrude radially outwardly, a clutch disc 103 inserted into an outer peripheral surface of clutch hub 102, a plurality of clutch plates 104 inserted into an inner peripheral surface of rotor 47, a hydraulic mechanism 105, and an elastic member 106.

Engine disconnecting clutch 44 is always engaged by bias force of elastic member 106. When the engine is started, rotor 47 rotates, and rotating force of rotor 47 is transmitted to the engine sequentially through engine disconnecting clutch 44, flywheel shaft 43, torque limiter-equipped flywheel 42, and crankshaft 41.

When the driving wheel is rotated or regeneratively braked with motive power from motor generator 45 only, hydraulic mechanism 105 is driven to release the engagement of engine disconnecting clutch 44. Torque limiter-equipped flywheel 42 includes a drive plate 110 fixed to an end of crankshaft 41, a mass 111 fixed to an outer peripheral edge of drive plate 110, a torque limiter 112, and a damper 113.

Torque limiter 112 includes an input plate 63 fixed to drive plate 110 together with mass 111 with a bolt 114, an output plate 60, a friction member 64, a disc spring 65.

Input plate 63 includes opposing plates 66 and 67. Opposing plates 66 and 67 are formed at a greater distance from each other on a more radially inward side than bolt 114.

Disc spring 65, a portion of output plate 60, and friction member 64 are disposed between opposing plates 66 and 67. Disc spring 65 is disposed between opposing plate 67 and output plate 60, and friction member 64 is disposed between output plate 60 and opposing plate 66. Disc spring 65 is fixed to opposing plate 67, with an inner end of disc spring 65 being in direct contact with output plate 60. Friction member 64 is fixed to plate 60*b*.

Output plate 60 includes a plate 60*a* and a plate 60*b*, and plates 60*a* and 60*b* are fixed with a fixing member 115. Disc spring 65 is pressing output plate 60 (plate 60*a*) toward opposing plate 66, and friction member 64 is in contact with opposing plate 66.

Plates 60*a* and 60*b* are formed at an increased distance from each other on a more radially inward side than fixing member 115, and an accommodating portion 116 that can accommodate a spring described below is formed more radially inward than fixing member 115.

Damper 113 includes a sleeve 120 spline-fit to flywheel shaft 43, a second output plate 117 fixed to a peripheral surface of sleeve 120, an accommodating hole 118 formed in second output plate 117, a spring 119 disposed in accommodating hole 118, and the above-described output plate 60.

Plates 60*a* and 60*b* have a window not shown herein, and spring 119 is engaged with an inner peripheral edge of the window and also with an inner peripheral surface of accommodating hole 118.

Motive power from the engine is transmitted to flywheel shaft 43 through crankshaft 41, opposing plate 66, friction member 64, output plate 60, spring 119, second output plate 117, and sleeve 120.

Output plate 60 and second output plate 117 are provided to rotate relative to each other, and spring 119 prevents fluctuations in the torque transmitted to second output plate 117 from output plate 60.

In torque limiter 10 according to the fifth embodiment of the invention, disc spring 65 and output plate 60 are in contact with each other, and output plate 60 and disc spring 65 are in contact with each other, in the path through which motive power is transmitted to output plate 60 from input plate 63.

Figure 12:
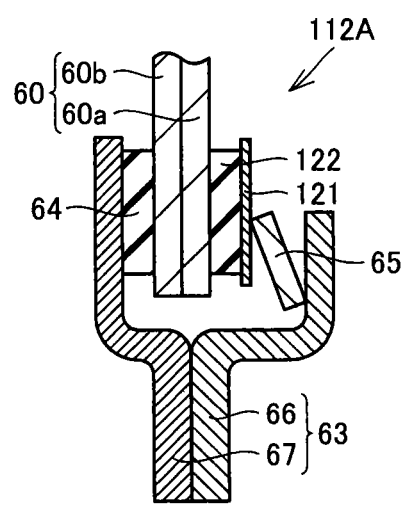
FIG. 12 is a cross-sectional view showing a portion of a torque limiter as a comparative example in connection with the torque limiter according to the fifth embodiment of the invention.

FIG. 12 is a cross-sectional view showing a portion of torque limiter 112A as a comparative example in connection with torque limiter 112 according to the fifth embodiment of the invention. In this comparative example shown in FIG. 12, torque limiter 112A includes friction member 64 fixed to plate 60*b*, a friction member 122 fixed to plate 60*a*, disc spring 65 fixed to opposing plate 66, and a pressing plate 121 pressed by disc spring 65 and abutting on friction member 122. Pressing plate 121 is connected to opposing plate 66. In torque limiter 112A also, friction member 64 is being pressed against opposing plate 67 by the pressing force from disc spring 65.

In torque limiter 112A, pressing plate 121 and friction member 122 are in contact with each other so as to be movable relative to each other, and friction member 64 and opposing plate 67 are also in contact with each other so as to be movable relative to each other, in the path through which motive power is transmitted to output plate 60 from input plate 63.

In torque limiter 112 according to the fifth embodiment of the invention, disc spring 65 and plate 60*a* are in direct contact with each other, as shown in FIG. 11.

Thus, in the path through which motive power is transmitted to output plate 60 from input plate 63, the area where the members are in contact with each other so as to be movable relative to each other is smaller in torque limiter 112 according to the fifth embodiment of the invention than in torque limiter 10A of the comparative example.

In the case of rust formation, adhesion strength created in torque limiter 112 according to the fifth embodiment of the invention is suppressed to be lower than that in torque limiter 112A of the comparative example. Moreover, with torque limiter 112 according to the fifth embodiment of the invention, even in the case of rust formation, the threshold value at which torque limiter 112 is operated can be prevented from becoming excessively great.

While embodiments of the present invention have been described as above, it should be understood that the embodiments disclosed herein are illustrative and non-restrictive in every respect. The scope of the present invention is defined by the terms of the claims, and is intended to include any modifications within the scope and meaning equivalent to the terms of the claims.

INDUSTRIAL APPLICABILITY

The present invention is applicable to a torque limiter and a power transmission device, and is particularly suitable as a torque limiter and a power transmission device mounted on a hybrid vehicle.

REFERENCE SIGNS LIST

1: hybrid vehicle, 2: engine, 3: wheel, 4: input shaft, 5: output shaft, 6: differential gear, 7: crankshaft, 8: flywheel, 9: sleeve, 10: torque limiter, 12, 11: motor generator, 13: casing, 14: stator, 15: rotor, 16: power split device, 17: sun gear, 18: ring gear, 19: pinion gear, 20: carrier, 21: annular member, 22: gear, 23: parking gear, 24: ring gear, 25: parking ball, 26: planetary gear, 27 sun gear, 28: pinion gear, 29: carrier, 30: stator, 31: rotor, 32: driven gear, 33 final drive pinion gear, 34: differential case, 35: ring gear, 36: driveshaft, 37: vehicle speed sensor, 39: connecting portion, 50: electronic control unit, 56: power storage device, 60: output plate, 61, 62: main surface, 63: input plate, 64: friction member, 65: disc spring, 66: opposing plate, 67: opposing plate, 69: groove, 71: lubricant, 72: sealing member, 80: contact piece, 81: disc spring main body, 82: curved portion, 83: root portion, 84: tip portion.

The invention claimed is:

1. A torque limiter mounted on a hybrid vehicle and provided within a power transmission path through which motive power is transmitted from a drive unit, for relieving motive power transmitted when excessive motive power is applied to said power transmission path, comprising:
   a first rotating member including a first main surface and a second main surface located opposite to said first main surface;
   a second rotating member including a first region facing said first main surface of said first rotating member and a second region facing said second main surface of said first rotating member;
   a transmission member provided between said first main surface and said first region and capable of transmitting the motive power to said first rotating member from said second rotating member; and
   a biasing member provided between said second main surface and said second region, wherein
   said biasing member being in contact with said second main surface, for biasing said first rotating member toward said first region, thereby pressing said transmission member against said first region,
   a contact area between said biasing member and said first rotating member being smaller than that between said transmission member and said first region, and
   said first rotating member is an output plate that outputs motive power after said torque limiter has relieved the motive power from said drive unit.

2. The torque limiter according to claim 1, wherein
   an annular groove is formed in said second main surface, and an end of said biasing member facing said second main surface enters within said groove.

3. The torque limiter according to claim 1, wherein
   said biasing member includes a disc spring main body having a hollow truncated conical shape, and a contact piece provided at a tip portion of said disc spring main body, and
   said contact piece is formed to project toward said first rotating member more than the tip portion of said disc spring main body.

4. The torque limiter according to claim 1, further comprising an annular sealing member provided on said second main surface, wherein
   said biasing member has an annular shape,
   a space is formed by said sealing member, said second main surface, and said biasing member, and
   said space is filled with a lubricant.

5. A power transmission device comprising the torque limiter according to claim 1.

* * * * *